United States Patent
Vaidya et al.

(10) Patent No.: US 12,492,350 B2
(45) Date of Patent: Dec. 9, 2025

(54) RADON LEVEL MANAGEMENT OF NATURAL GAS FROM UNCONVENTIONAL AND CONVENTIONAL RESOURCES

(71) Applicant: Saudi Arabian Oil Company, Dhahran (SA)

(72) Inventors: Milind M. Vaidya, Dhahran (SA); Sebastien A. Duval, Dhahran (SA); Feras Hamad, Dhahran (SA); Faisal D. Al-Otaibi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 64 days.

(21) Appl. No.: 18/474,720

(22) Filed: Sep. 26, 2023

(65) Prior Publication Data

US 2025/0101328 A1 Mar. 27, 2025

(51) Int. Cl.
*C10L 3/10* (2006.01)
*B01D 53/22* (2006.01)
*B01D 71/70* (2006.01)

(52) U.S. Cl.
CPC .......... *C10L 3/101* (2013.01); *B01D 53/226* (2013.01); *B01D 53/228* (2013.01); *B01D 71/701* (2022.08); *B01D 2257/11* (2013.01); *B01D 2311/2512* (2022.08); *C10L 2290/548* (2013.01)

(58) Field of Classification Search
None
See application file for complete search history.

(56) References Cited

U.S. PATENT DOCUMENTS

| | | | |
|---|---|---|---|
| 3,274,750 A | 9/1966 | Robb | |
| 4,230,463 A * | 10/1980 | Henis | B01D 71/421 |
| | | | 95/55 |
| 4,371,383 A * | 2/1983 | Rost | B01D 19/0047 |
| | | | 96/418 |
| 4,869,832 A * | 9/1989 | Lamarre | G21F 9/12 |
| | | | 95/263 |
| 5,100,555 A | 3/1992 | Matson | |
| 5,194,158 A | 3/1993 | Matson | |

(Continued)

FOREIGN PATENT DOCUMENTS

WO WO 1991019560 12/1991

OTHER PUBLICATIONS

Al-Masri et al., "Radon gas distribution in natural gas processing facilities and workplace air environment," Journal of Environmental Radioactivity, 99:4:574-580, 7 pages.

(Continued)

*Primary Examiner* — Tam M Nguyen
(74) *Attorney, Agent, or Firm* — Fish & Richardson P.C.

(57) ABSTRACT

Provided herein are systems and methods for removing radon from a natural gas stream. The system includes a radon permeable membrane. The radon permeable membrane is configured to separate a natural gas stream into a radon rich permeate stream and a radon reduced retentate stream. The radon rich stream can be stored for a period of time to yield a decayed permeate stream or reinjected into the source formation. The system can include a second radon permeable membrane configured to separate the radon reduced retentate stream into a second permeable stream and a second retentate stream. The decayed permeate stream and second retentate stream can be combined to form a sales gas.

14 Claims, 6 Drawing Sheets

(56) References Cited

U.S. PATENT DOCUMENTS

| | | | |
|---|---|---|---|
| 5,194,185 A | 3/1993 | Cannon et al. | |
| 2007/0012190 A1* | 1/2007 | Gerner | B01D 19/0031 96/6 |
| 2022/0056660 A1* | 2/2022 | Busatta | B32B 27/32 |
| 2025/0101265 A1* | 3/2025 | Da Rin | B32B 27/308 |

OTHER PUBLICATIONS

Chanyotha, et al. "Determination of radon in natural gas pipelines," Journal of Radioanalytical and Nuclear Chemistry, Sep. 2015, 307:2095-2099, 5 pages.

Faul et al., "Radon in helium bearing natural gas of the Texas panhandle," United States Department of the Interior Geological Survey, Trace Element Memorandum Report 239, Feb. 1951, 32 pages.

Iida et al., "A new method for supplying low Radon air by using a hollow fiber module," Radioactivity in the Environment, Dec. 2005, 7: 497-505, 9 pages.

Iida et al., "Study on a New Method for Reducing Radon Level in Indoor Air," Radon in the Living Environment, Apr. 19-23, 1999, Athens, Greece, 3 pages (abstract only).

Kraemer, "Radon in Unconventional Natural Gas From Gulf Coast Geopressured-Geothermal Reservoirs," Environmental Science and Technology, 1986, 20(9):939-942, 4 pages.

Merkel et al., Mixed-gas permeation of syngas components in poly (dimethyl siloxane) and poly(1-trimethylsily1-1-propyne) at elevated temperatures, Journal of Membrane Science, Sep. 2001, 191(1-2):85-94, 10 pages.

Merkel et al., "Gas Sorption, Diffusion, and Permeation in Poly(dimethyl siloxane)," Journal of Polymer Science: Part B: Polymer Physics, Jan. 2000, 38:415-434, 20 pages.

Rainey et al., "Completion Report—Evaluation of the Use of Permselective Membranes in the Nuclear Industry for Removing Radioactive Xenon and Krypton from Various Off-Gas Streams," ORNL-4522 report Contract No. W-7405-eng-26 Oak Ridge National Laboratory, Apr. 1971, 57 pages.

Resnikoff, "Radon in Natural Gas from Marcellus Shale," NEOGAP, Network for Oil & Gas Accountability and Protection, Jan. 2012, 14 pages.

Rowan et al., "Radon-222 Content of Natural Gas Samples from Upper and Middle Devonian Sandstone and Shale Reservoirs in Pennsylvania: Preliminary Data," U.S. Geological Survey Open-File Report, 2012, 9 pages.

\* cited by examiner

RADON LEVEL MANAGEMENT OF NATURAL GAS FROM UNCONVENTIONAL AND CONVENTIONAL RESOURCES

TECHNICAL FIELD

This document relates to systems and methods for reducing the concentration of radon in a natural gas stream.

BACKGROUND

Radon is a naturally occurring radioactive material, identified as the second leading cause of lung cancer in the United States. Radon results from the radioactive decay of thorium and uranium. Natural gas from shale formations, as well as from conventional and unconventional sources, can have high concentrations of radon. This radon is a significant public health hazard, as radon at the wellhead can be transported through natural gas pipelines to gas plants, power plants, distribution centers, and to homes for use in cooking and heating. Radon can contaminate these plants, centers, and homes when they are poorly aerated.

Natural gas containing high levels of radon cannot be immediately shipped to an end customer. Currently, natural gas containing unsafe levels of radon is held in storage to allow the radon to naturally decay. However, this is a time consuming and inefficient process.

Radon can result from two different radioactive decay pathways, uranium-238 decay and thorium-232 decay. Radon resulting from uranium decay exists as radon-222 and decays in a slower process, with a half-life of 3.82 days.

The significant public health hazard associated with radon contaminated natural gas arises from radioactive radon-222 isotopes. The potential for lung cancer increases for natural gas end users or customers depending on the concentration of radon-222 in a natural gas stream.

Compounding the public health concerns, radon-222 is inert with respect to traditional natural gas processes like gas sweetening, nitrogen recovery, or natural gas liquid recovery. Accordingly, radon-222 can become a component of a sales gas at an even higher concentration due to the removal of other components from the natural gas stream. A sales gas is the processed natural gas stream that can be safely sent to an end user. Sales gas includes methane, ethane, and traces of heavier hydrocarbons, as well as less than 2% $CO_2$ and $N_2$ to maintain a minimal heating value per standard cubic foot (scf), for example 995 British Thermal Units (Btu) per standard cubic foot (10.3 kilowatt hour/cubic meter).

Currently, radon in natural gas is mitigated by storing the radon and allowing it to decay to the acceptable limit of 4 pCi/L radioactivity.

SUMMARY

Provided in the present disclosure are systems and methods for removing radon from a natural gas stream.

In some embodiments, a system for removing radon from a natural gas stream includes a first radon permeable membrane configured to receive a natural gas stream from a natural gas source, wherein the radon permeable membrane is configured to separate the natural gas stream into a radon rich permeate stream with a higher concentration of radon than the natural gas stream and a radon reduced retentate stream with a lower concentration of radon than the natural gas stream.

In some embodiments, the first radon permeable membrane includes a polysiloxane-type membrane.

In some embodiments, the polysiloxane-type membrane includes poly di-R,R'-siloxane, wherein R and R' are selected from the group consisting of methyl, ethyl, propyl, butyl, pentyl, hexyl, heptyl, octyl, nonyl, decyl, undecyl, dodecyl, phenyl, and naphthyl functional groups.

In some embodiments, the polysiloxane-type membrane includes polydimethylsiloxane.

In some embodiments, the system is further configured to reinject the radon rich permeate stream into the natural gas source.

In some embodiments, the system further includes a storage unit, wherein the storage unit is configured and coupled to receive the radon rich permeate stream from the first radon permeable membrane and to store the radon rich permeate stream for a period of time to yield a decayed permeate stream.

In some embodiments, the system is configured and coupled to combine the decayed permeate stream from the storage unit with the radon reduced retentate stream to form a sales gas stream.

In some embodiments, the system further includes a second radon permeable membrane, wherein the second radon permeable membrane is configured and coupled to receive the radon reduced retentate stream from the first radon permeable membrane and to separate the radon reduced retentate stream into a second permeate stream and a second retentate stream.

In some embodiments, the second radon permeable membrane includes a polysiloxane-type membrane.

In some embodiments, the polysiloxane-type membrane includes poly di-R,R'-siloxane, wherein R and R' are selected from the group consisting of methyl, ethyl, propyl, butyl, pentyl, hexyl, heptyl, octyl, nonyl, decyl, undecyl, dodecyl, phenyl, and naphthyl functional groups.

In some embodiments, the polysiloxane-type membrane includes polydimethylsiloxane.

In some embodiments, the system is configured and coupled to combine the second permeate stream from the second radon permeable membrane with the natural gas stream upstream of the first radon permeable membrane.

In some embodiments, the system further includes a storage unit, wherein the storage unit is configured and coupled to receive the radon rich permeate stream from the first radon permeable membrane and to store the radon rich permeate stream for a period of time to yield a decayed permeate stream.

In some embodiments, the system is further configured and coupled to combine the decayed permeate stream from the storage unit with the second retentate stream to form a sales gas.

In some embodiments, a method for removing radon from a natural gas stream includes providing a natural gas stream from a natural gas source, and passing the natural gas stream through a radon permeable membrane to yield a retentate stream reduced in radon compared to the natural gas stream and a permeate stream enriched in radon compared to the natural gas stream.

In some embodiments, the radon permeable membrane includes a polysiloxane-type membrane.

In some embodiments, the polysiloxane-type membrane includes poly di-R,R'-siloxane, wherein R and R' are selected from the group consisting of methyl, ethyl, propyl, butyl, pentyl, hexyl, heptyl, octyl, nonyl, decyl, undecyl, dodecyl, phenyl, and naphthyl functional groups.

In some embodiments, the polysiloxane-type membrane includes polydimethylsiloxane.

In some embodiments, the method includes reinjecting the radon rich permeate stream into the natural gas source.

In some embodiments, the method includes storing the radon rich permeate stream in a storage unit for a period of time to yield a decayed permeate stream.

In some embodiments, the method includes combining the decayed permeate stream and the radon reduced retentate stream to form a sales gas stream.

In some embodiments, the method includes passing the radon reduced retentate stream through a second radon permeable membrane to yield a second permeate stream and a second retentate stream.

In some embodiments, the second radon permeable membrane includes a polysiloxane-type membrane.

In some embodiments, the polysiloxane-type membrane includes poly di-R,R'-siloxane, wherein R and R' are selected from the group consisting of methyl, ethyl, propyl, butyl, pentyl, hexyl, heptyl, octyl, nonyl, decyl, undecyl, dodecyl, phenyl, and naphthyl functional groups.

In some embodiments, the polysiloxane-type membrane includes polydimethylsiloxane.

In some embodiments, the method includes combining the second permeate stream with the natural gas stream upstream of the first radon permeable membrane.

In some embodiments, the method includes determining the concentration of radon-222 in the radon rich permeate stream, and storing the radon rich permeate stream in a storage unit for a period of time to yield a decayed permeate stream. The period of time is based on the concentration of radon-222 in the radon rich permeate stream, a transit time to an end user, or both the concentration of radon-222 in the radon rich permeate stream and a transit time to an end user.

In some embodiments, the method includes combining the decayed permeate stream with the second retentate stream to form a sales gas.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Typically, the residence time of a natural gas stream in a gas plant is in the range of 1 hour, and therefore the natural radioactive decay during gas processing is marginal and can be insufficient to reduce radon-222 concentration to safe levels. A level of 4 pCi/L is considered an acceptable upper limit of radon-222 in a natural gas stream that can be provided to an end user, for example for use in a residential area. However, the methods and systems described herein can be used to reduce radon to even lower concentrations as needed.

While the natural decay of radon-222 can provide some protection to the end consumer, reducing the initial concentration of radon-222 in a natural gas pipeline will provide further protection to the end user.

Provided in this disclosure, in part, are methods and systems for removing radon from a natural gas stream.

The methods and systems described herein utilize at least one radon selective membrane to treat a natural gas stream to remove radon and yield a natural gas stream with a safe level of radon. The safe level of radon can depend on the transit time to an end user.

Provided herein are systems and methods for reducing the concentration of radon-222 in a natural gas stream. A system for removing radon from a natural gas stream includes a first radon permeable membrane. The system is configured to provide a natural gas stream from a natural gas source to the first radon permeable membrane. The radon permeable membrane is configured to separate the natural gas stream into a radon rich permeate stream with a higher concentration of radon than the natural gas stream and a radon reduced retentate stream with a lower concentration of radon than the natural gas stream.

In some embodiments, the radon permeable membrane includes polydimethylsiloxane.

In some embodiments, the system is further configured to reinject the radon rich permeate stream from the first radon permeable membrane into the natural gas source.

In some embodiments, the system includes a storage unit. The storage unit is configured and coupled to receive the radon rich permeate stream from the first radon permeable membrane and to store the radon rich permeate stream for a period of time to yield a decayed permeate stream. For example, the storage unit can be coupled to the first radon permeable membrane.

In some embodiments, the system is configured and coupled to combine the decayed permeate stream from the storage unit with the radon reduced retentate stream to form a sales gas stream.

In some embodiments, the system includes a second radon permeable membrane. The second radon permeable membrane is configured and coupled to receive the radon reduced retentate stream from the first radon permeable membrane. For example, the second radon permeable membrane is coupled to the first radon permeable membrane. The second radon permeable membrane separates the radon reduced retentate stream into a second permeate stream and a second retentate stream.

In some embodiments, the second radon permeable membrane includes polydimethylsiloxane.

In some embodiments, the system is configured and coupled to combine the second permeate stream from the second radon permeable membrane with the natural gas stream upstream of the first radon permeable membrane.

In some embodiments, the system includes a storage unit. The storage unit is configured and coupled to receive the radon rich permeate stream from the first radon permeable membrane. For example, the storage unit is coupled to the first radon permeable membrane. The storage unit is configured to store the radon rich permeate stream for a period of time to yield a decayed permeate stream.

The system is configured and coupled to combine the decayed permeate stream from the storage unit with the second retentate stream to form a sales gas. For example, the storage unit is coupled to the second retentate stream.

A method for removing radon from a natural gas stream includes providing a natural gas stream from a natural gas source, and passing the natural gas stream through a radon permeable membrane to yield a retentate stream reduced in radon compared to the natural gas stream and a permeate stream enriched in radon compared to the natural gas stream.

In some embodiments, the radon permeable membrane includes polydimethylsiloxane.

In some embodiments, the method includes reinjecting the radon rich permeate stream into the natural gas source.

In some embodiments, the method includes storing the radon rich permeate stream in a storage unit for a period of time to yield a decayed permeate stream.

In some embodiments, the method includes combining the decayed permeate stream and the radon reduced retentate stream to form a sale gas stream.

In some embodiments, the method includes passing the radon reduced retentate stream through a second radon permeable membrane to yield a second permeate stream and a second retentate stream.

In some embodiments, the second radon permeable membrane includes polydimethylsiloxane.

In some embodiments, the method includes combining the second permeate stream with the natural gas stream upstream of the first radon permeable membrane.

In some embodiments, the method includes determining the concentration of radon-222 in the radon rich permeate stream, and storing the radon rich permeate stream in a storage unit for a period of time to yield a decayed permeate stream. The period of time is based on the concentration of radon-222 in the radon rich permeate stream, a transit time to an end user, or both the concentration of radon-222 in the radon rich permeate stream and a transit time to an end user. As described in the examples, the transit time of a gas can be calculated from the pipeline length and velocity. Based on the transit time and the desired final concentration, a maximum initial amount of radon-222 can be calculated. If the amount of radon in the natural gas exceeds the maximum initial amount of radon-222 allowable, the natural gas can be held in storage until the radon decays to the maximum initial amount allowable.

In some embodiments, the method includes combining the decayed permeate stream with the second retentate stream to form a sales gas.

Figure 1:
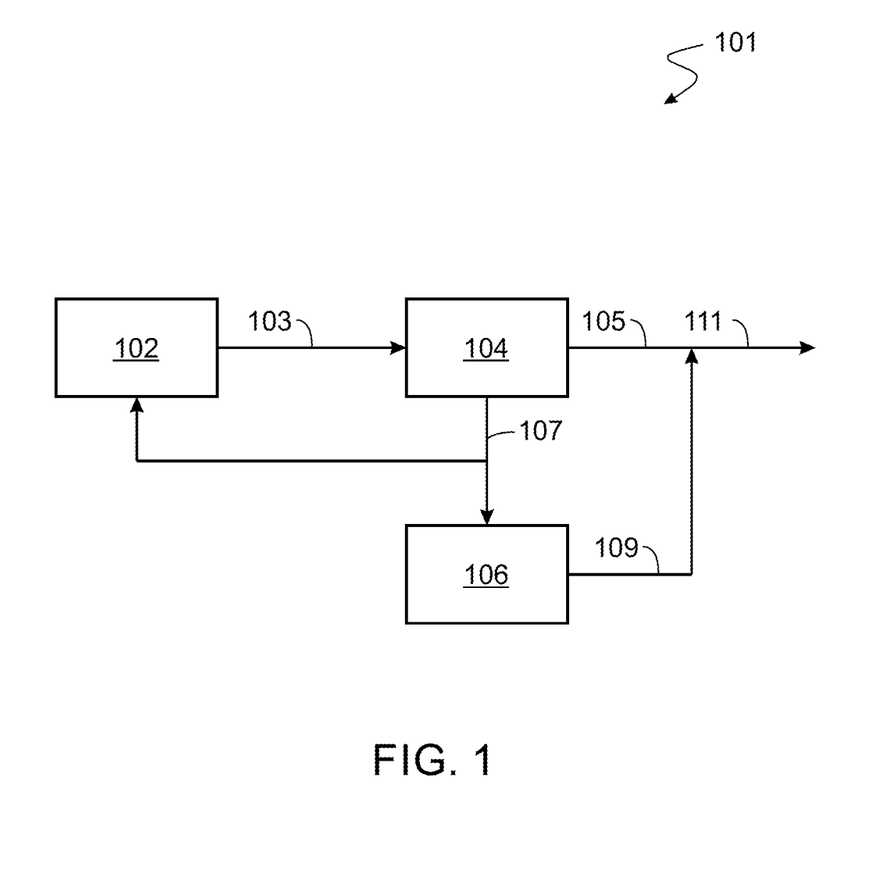
FIG. 1 shows an example schematic diagram of a system for removing radon from a natural gas stream.

FIG. 1 shows an example schematic diagram of a system 101 for removing radon from a natural gas stream. The system 101 includes a radon permeable membrane 104. The radon permeable membrane partially segregates a natural gas stream 103 into a retentate stream 105 that is reduced in radon and a permeate stream 107 that is enriched in radon. The radon reduced retentate stream 105 can be safely sent to an end user as a sales gas stream 111. The radon rich permeate stream 107 can be re-injected into the source formation 102 or held in a storage container 106 for a period of time. In storage, the natural radioactive decay of radon can reduce the radioactivity to an acceptable level, resulting in a decayed permeate stream 109. In some embodiments, the decayed permeate stream 109 is combined with the radon reduced retentate stream 105 and therefore the sales gas stream 111 includes both the retentate stream 105 and the decayed permeate stream 109. The sales gas stream 111 can be provided to end users.

Figure 2:
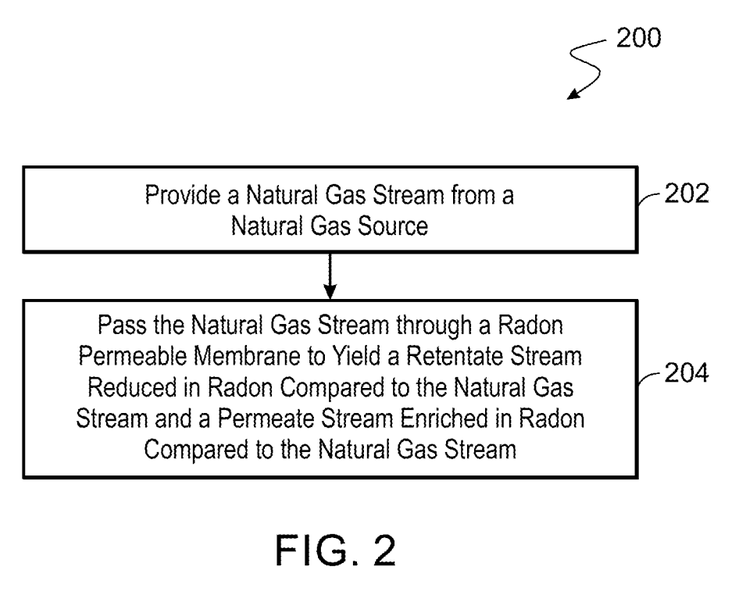
FIG. 2 is a flowchart of an example method of removing radon from a natural gas stream.

FIG. 2 shows an example method 200 of removing radon from a natural gas stream. At 202, a natural gas stream is received from a natural gas source. The natural gas source can be a subterranean formation, a conventional gas source, or an unconventional gas source. At 204, the natural gas stream is separated into a radon reduced retentate stream and a radon rich permeate stream using a radon permeable membrane. In some embodiments, the radon permeable membrane includes polysiloxane-type membranes. In some embodiments, the polysiloxane-type membrane includes poly di-R,R'-siloxane, where R and R' are methyl, ethyl, propyl, butyl, pentyl, hexyl, heptyl, octyl, nonyl, decyl, undecyl, dodecyl groups, phenyl, or naphthyl groups. In some embodiments, the method includes reinjecting the radon rich permeate stream back into the natural gas source. For example, the radon rich permeate stream can be injected into the natural gas source upstream of the radon permeable membrane. In some embodiments, the method includes storing the radon rich permeate stream in a storage unit for a period of time to yield a decayed permeate stream. During this period of time in storage, the concentration of the radon-222 present in the stream decreases due to the natural decay of radon-222. In some embodiments, the concentration of radon-222 present in the radon rich permeate stream is measured. In some embodiments, the radon rich permeate stream is stored in the storage unit for a period of time based on the concentration of radon-222 in the radon rich permeate stream. The period of time is sufficient to allow the radon in the radon rich permeate stream to decay to an acceptable concentration to yield a decayed permeate stream. In some embodiments, the period of time is based on the transit time necessary to deliver the sales gas stream to an end user. In some embodiments, the period of time is based on both the concentration of the radon rich permeate stream and the transit time necessary to deliver the sales gas stream to an end user.

In some embodiments, the method includes combining the decayed permeate stream and a radon reduced retentate stream to form a sales gas stream. In some embodiments, the sales gas stream is sent to an end-user.

Figure 3:
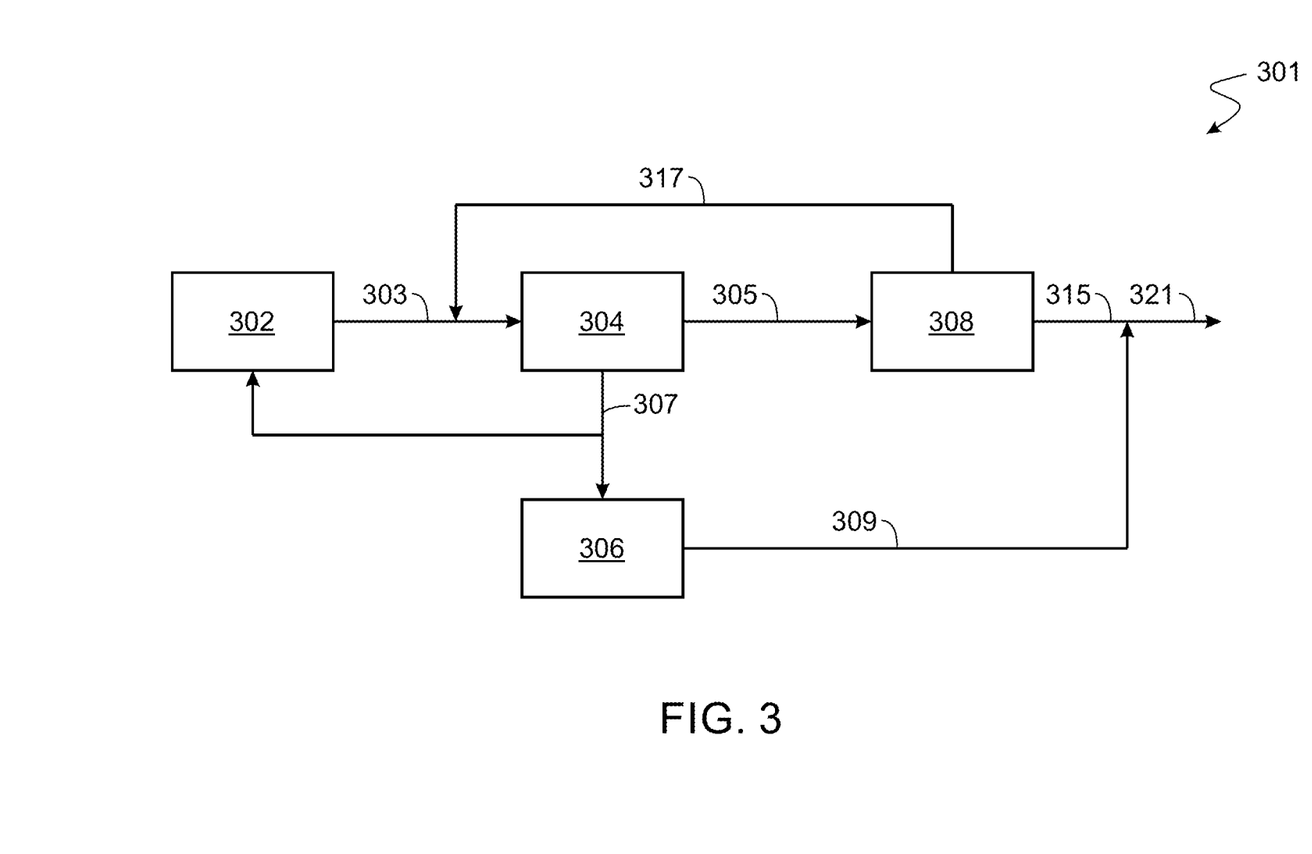
FIG. 3 shows an example schematic diagram for a system with a 2-step process to remove radon-222 from a natural gas stream.

FIG. 3 shows an example schematic diagram for a system 301 with a 2-step process to remove radon-222 from a natural gas stream. A first radon permeable membrane 304 separates a natural gas stream 303 into a radon reduced retentate stream 305 that is reduced in radon and a radon rich permeate stream 307 that is enriched in radon. The radon rich permeate stream 307 can be reinjected into the source formation 302 or sent to a storage tank or facility 306. In some embodiments, the natural decay of radon in the storage tank results in a decayed permeate stream 309.

The radon reduced retentate stream 305 is sent to a second radon permeable membrane 308. The second radon permeable membrane 308 separates the radon reduced retentate stream 305 into a second permeate stream 317 that is recombined with the natural gas stream 303 and a second retentate stream 315 that can be send to an end user as a sales gas 321. In some embodiments, a compressor can be used to recycle the second permeate stream 317 back into the natural gas stream 303. In some embodiments, the decayed permeate stream 309 is combined the second retentate stream 315 and the sales gas 321 includes second retentate stream 315 and the decayed permeate stream 309. The sales gas 321 can be sent to an end user.

Figure 4:
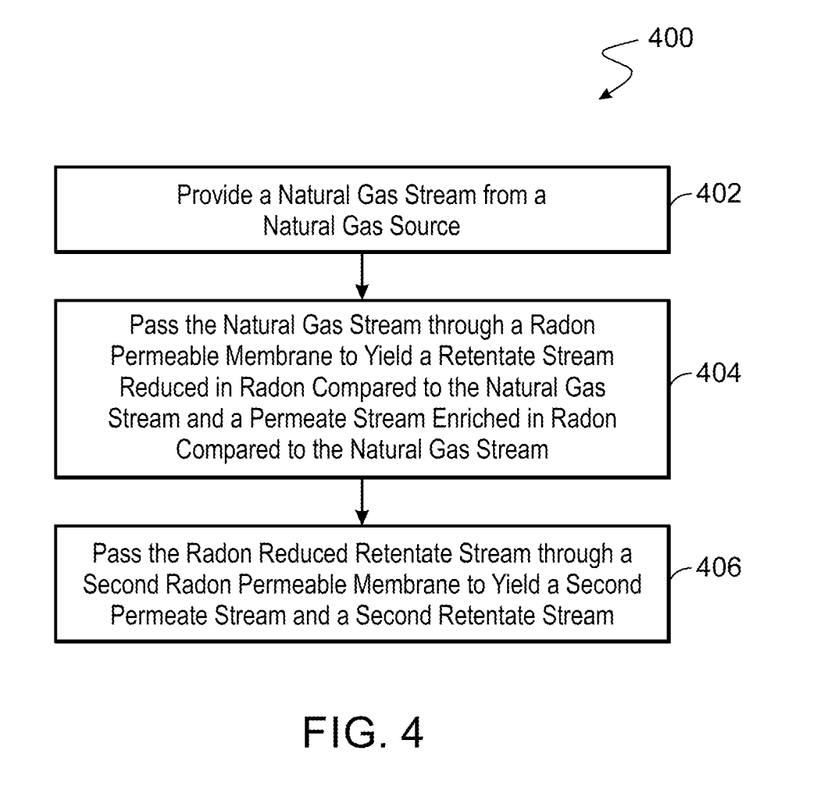
FIG. 4 shows an example method of removing radon from a natural gas stream.

FIG. 4 shows an example method 400 of removing radon from a natural gas stream. At 402 a natural gas stream is received from a natural gas source. The natural gas source can be a subterranean formation, a conventional gas source, or an unconventional gas source. At 404 the natural gas stream is separated into a radon reduced retentate stream and a radon rich permeate stream using a radon permeable membrane. In some embodiments, the radon permeable membrane includes polydimethylsiloxane.

At 406, the radon reduced retentate stream is separated into a second permeate stream and a second retentate stream using a second radon permeable membrane. In some embodiments, the second radon permeable membrane includes polydimethylsiloxane. In some embodiments, the method includes combining the second permeate stream with the natural gas stream, upstream of the radon permeable membrane.

In some embodiments, the method includes measuring the concentration of radon-222 in the radon rich permeate stream, and storing the radon rich permeate stream in a storage unit for a period of time to yield a decayed permeate stream. The period of time is based on the concentration of radon-222 in the radon rich permeate stream, the transit time to an end user, or both. During this period of time in storage, the concentration of the radon-222 present in the stream decreases due to the natural decay of radon-222.

Figure 5A:
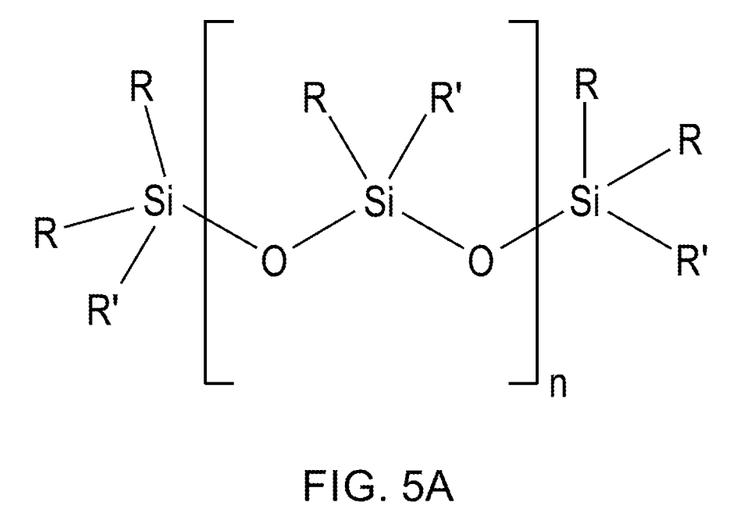
FIG. 5A shows the general chemical structure of a polysiloxane that can be used in a polysiloxane-type membrane.
Figure 5B:
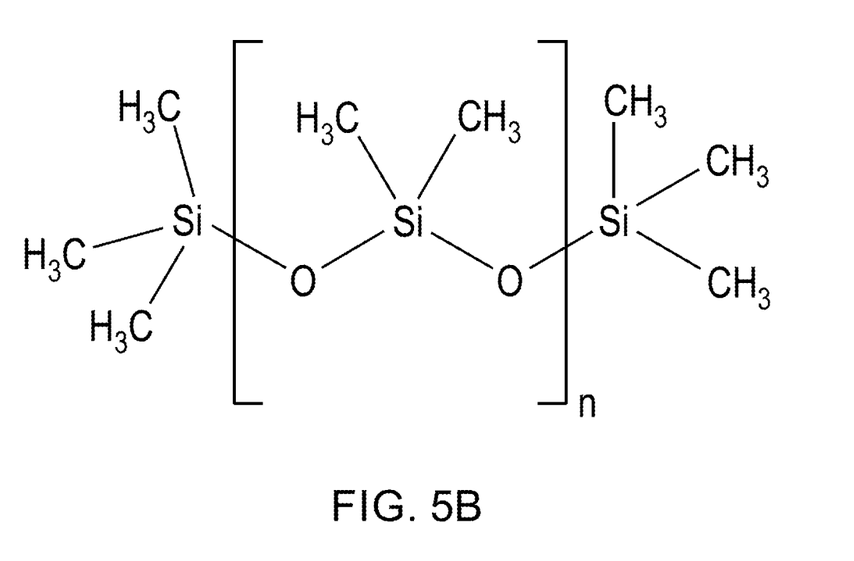
FIG. 5B shows the chemical structure of polydimethylsiloxane.

In some embodiments, the radon permeable membranes 104, 304, and 308 include polysiloxane-type membranes. FIG. 5A shows the general chemical structure of a polysiloxane that can be used in a polysiloxane-type membrane. In some embodiments, the polysiloxane-type membrane includes poly di-R,R'-siloxane, where R and R' are methyl, ethyl, propyl, butyl, pentyl, hexyl, heptyl, octyl, nonyl, decyl, undecyl, dodecyl groups, phenyl, or naphthyl groups. In some embodiments, the radon permeable membranes 104, 304, and 308 include polydimethylsiloxane. FIG. 5B shows the chemical structure of polydimethylsiloxane. The permeability of radon in polydimethylsiloxane is estimated by extrapolating from the permeability values measured for other noble gases.

Definitions

Unless otherwise defined, all technical and scientific terms used in this document have the same meaning as commonly understood by one of ordinary skill in the art to which the present disclosure belongs. Methods and materials are described in this document for use in the present disclosure; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The terms "sour" or "sour gas" mean that the gas stream contains hydrogen sulfide ($H_2S$). The terms "sweet" or "sweet gas" mean that the gas contains little or no hydrogen sulfide ($H_2S$).

As used in this disclosure, a "sales gas" is the processed natural gas stream that can be safely sent to an end user. Sales gas includes methane, ethane, and traces of heavier hydrocarbons, as well as less than 2% $CO_2$ and $N_2$ to maintain a minimal heating value per standard cubic foot (scf), for example 995 British Thermal Units (Btu) per standard cubic foot (10.3 kilowatt hour/cubic meter).

As used in this disclosure, "configured to" indicates that the feature is arranged and inherently capable of performing the recited function.

As used in this disclosure, a feature "coupled to receive" a second feature indicates that the feature is capable of receiving a second feature. As used in this disclosure, a feature "coupled to combine" a two or more features indicates that the feature is capable of combining the two or more features. As used in this disclosure, a feature "coupled to separate" a second feature indicates that the feature is capable of separating the second feature.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

EXAMPLES

Example 1: Determining the Maximum Amount of Radon in a Sales Gas

Table 1 lists the transit time for a given average gas velocity as a function of pipeline length. Table 2 lists the remaining fraction of radon-222 after transit for a given average gas velocity and given pipeline length.

TABLE 1

Estimation of transit time for a given gas velocity and pipeline length

|  |  | Pipeline length, miles | | | |
|---|---|---|---|---|---|
|  |  | 100 | 300 | 500 | 1000 |
| Average Gas velocity, mph | 7 | 14.286 | 42.857 | 71.429 | 142.857 |
|  | 10 | 10.000 | 30.000 | 50.000 | 100.000 |
|  | 13 | 7.692 | 23.077 | 38.462 | 76.923 |
|  | 16 | 6.250 | 18.750 | 31.250 | 62.500 |

TABLE 2

Fraction of Rn-222 remaining after transit

|  |  | Pipeline length, miles | | | |
|---|---|---|---|---|---|
|  |  | 100 | 300 | 500 | 1000 |
| Average Gas velocity, mph | 7 | 0.900 | 0.726 | 0.586 | 0.343 |
|  | 10 | 0.929 | 0.799 | 0.688 | 0.472 |
|  | 13 | 0.945 | 0.842 | 0.750 | 0.562 |
|  | 16 | 0.956 | 0.870 | 0.792 | 0.626 |

As shown in Tables 1-2, in short pipelines, natural gas containing radon-222 will retain a significant fraction of the radon-222 because the transit time is too short to achieve significant decay. The maximum initial concentration $N_m$ in pCi/L of radon-222 that can enter a pipeline for a given transit time t in hours can be calculated using Equation 3:

$$4.0\, pCi/L = N_m \left(\frac{1}{2}\right)^{\frac{t}{91.2\,hr}} \qquad \text{Eq. 3}$$

where the half-life of radon-222 is given in hours, 91.2 hr. Table 3 lists the maximum initial concentrations of radon-222 that will result in a final concentration of 4.0 pCi/L or less for a given pipeline length and gas velocity.

TABLE 3

Maximum initial concentration of Rn-222 entering a pipe, such that exiting gas does not exceed 4.0 pCi/L

|  |  | Pipeline length, miles | | | |
|---|---|---|---|---|---|
|  |  | 100 | 300 | 500 | 1000 |
| Average Gas velocity, mph | 7 | 4.446 | 5.512 | 6.832 | 11.677 |
|  | 10 | 4.305 | 5.004 | 5.816 | 8.466 |
|  | 13 | 4.231 | 4.750 | 5.333 | 7.119 |
|  | 16 | 4.186 | 4.598 | 5.051 | 6.388 |

For example, for gas traveling 1,000 miles at a velocity of 7 mph, an initial radon-222 concentration of 11.6 pCi/L is acceptable to meet a targeted value of 4 pCi/L for the end consumer. If the gas velocity is 13 mph for the same pipeline length, the allowable initial concentration will be 8.4 pCi/L.

Accordingly, the maximum amount of radon allowable as an initial concentration of radon can be calculated. If the amount of radon in a natural gas source exceeds the maximum allowable amount, treating the natural gas with a radon permeable reduce the radon to an acceptable concentration.

Example 2: Determining the Permeability of Radon in a Polydimethylsiloxane Membrane The permeability of helium, argon, krypton, and xenon in silicone rubber are listed in U.S. Pat. Nos. 3,274,750 and 5,100,555. These values are shown in Table 4. In addition, the permeant molecular weight and the Lennard-Jones parameter epsilon/k of radon are estimated. These values are also shown in Table 4. The Lennard-Jones parameter (K) is estimated by extrapolating from the correlation between the Lennard-Jones Parameter (K) and the critical temperature of the noble gasses He, Ar, Kr, and Xe. The permeability of radon was extrapolated from semi log plots of permeability vs molecular weight and the Lennard-Jones parameter K for the noble gasses He, Ar, Kr, and Xe. The permeability of other typical components of a natural gas stream in a polydimethylsiloxane membrane are given in Table 5. Typical components of a natural gas stream include methane ($CH_4$), ethane ($C_2H_6$), propane ($C_3H_8$), carbon dioxide ($CO_2$), nitrogen gas ($N_2$), and radon (Rn).

TABLE 4

Permeability of Noble Gases in a Silicone Rubber Membrane
Permeability of Silicone Rubber to Noble Gases

| Noble gas | Molecular weight | Lennard-Jones Parameter ε/κ (K) | Permeability, Barrer |
|---|---|---|---|
| He | 4.0 | 10.2 | 355 |
| Ar | 40.0 | 93.3 | 61.3 |
| Kr | 83.8 | 209.4 | 980 |
| Xe | 131.3 | 231 | 2030 |
| Rn | 222 | 377* | 6500** |

1 barrer = $10^{-10}(cm^3$ (STP) $cm/cm^2$ s cmHg)
*Estimated from critical temperature correlation
**Extrapolated from semi log plots of permeability vs MW and ε/κ.

TABLE 5

Permeability of the components of a feed gas

| Component | Permeability, Barrer |
|---|---|
| $CH_4$ | 850[a] |
| $C_2H_6$ | 2100[a] |
| $C_3H_8$ | 2900[b] |
| $CO_2$ | 3200[a] |
| $N_2$ | 380[a] |
| Rn | 6500[c] |

1 barrer = $10^{-10}(cm^3$ (STP) $cm/cm^2$ s cmHg)
[a]Gas Sorption, Diffusion, and Permeation in poly(dimethyl siloxane); Merkel, T. C. et al. *Journal of Polymer Science: Part B: Polymer Physics.* 2000 (38) pp. 415-434.
[b]UNITED STATES DEPARTMENT OF THE INTERIOR GEOLOGICAL SURVEY Trace Element memorandum report 239 "Radon in helium bearing natural gas of the Texas panhandle" Faul, G. et al. (1951)
[c]U.S. Pat. No. 5,194,158 "Radon Removal System and Process"

It has been shown that polysiloxane membranes are stable in the presence of radiation. For example, when exposed to 107 to 108 rad, the nitrogen, oxygen, and $CO_2$ permeabilities of polysiloxane membranes decreased only by 10 to 20%, with a 2 to 20% increase in separation factors. See, e.g., "Completion Report-Evaluation of the use of permselective membranes in the nuclear industry for removing radioactive xenon and krypton from various off-gas streams," R. H. Rainet, et al. (1971). Accordingly, polysiloxane membranes are stable even with radiation exposure and can be used to separate radon from natural gas.

Example 3: Simulated Radon Removal System with Low Radon, Low Pressure Permeate A simulation of a system 301 was used to calculate the parameters of the second retentate stream 315 and the second permeate stream 317, given a feed stream 303 with the parameters shown in Table 6. The values in Table 6 were calculated using process simulation software PRO II from Aveva, which can generate heat and material balance for membrane process with given permeability factors and membrane surface area. The surface areas of the membranes (304, 308) are given in arbitrary units, since the surface area will vary with membrane thickness.

Given a natural gas stream 303 that includes a feed vapor at a pressure of 800 PSIA, a first membrane 304 with a surface area of 1000 arbitrary units and a second membrane 308 with a surface area of 2000 arbitrary units, and an initial concentration of 28 pCi/L radon-222, the second retentate stream 315 will have a radon-222 concentration of 3.92 pCi/L, which is below the target value of 4 pCi/L. Accordingly, a natural gas with 28 pCi/L can be successfully treated with this approach and shipped to an end user. The characteristics of the first permeate stream 307 are also shown in Table 6.

TABLE 6

Simulated radon removal system with low radon, low pressure permeate

| Stream Name | | FEED 303 | SECOND RETENTATE STREAM 315 | FIRST PERMEATE STREAM 307 |
|---|---|---|---|---|
| Phase | | Vapor | Vapor | Vapor |
| Pressure (PSIA) | | 800 | 795 | 22 |
| Flowrate (kg · mol/h) | | 100 | 80.482 | 19.518 |
| Composition | Concentration | | | |
| Methane | Mole fraction | 0.9539 | 0.9589995 | 0.912077 |
| Ethane | Mole fraction | 0.005 | 0.004514 | 0.011555 |
| Propane | Mole fraction | 0.001 | 0.000807 | 0.003007 |
| $N_2$ | Mole fraction | 0.02 | 0.020273 | 0.00834 |
| $CO_2$ | Mole fraction | 0.02 | 0.015386 | 0.064528 |
| $H_2O$ | Mole fraction | 0.0001 | 0.000025 | 0.000493 |
| Radon-222 | pCi/L | 28 | 3.92 | 127.5 |

Example 4: Simulated Radon Removal System with Very Low Radon, High Pressure Permeate A simulation of a system 301 was used to calculate the parameters of the second retentate stream 315 and the first permeate stream 307, given a feed stream 303 with the parameters shown in Table 7. The surface areas of the membranes (304, 308) are given in arbitrary units.

In this simulation the permeate stream 307 is set to a simulated pressure of 150 PSI and yields a first permeate stream 307. Given a natural gas stream 303 that includes a feed vapor at a pressure of 800 PSIA and an initial concentration of 6.5 pCi/L radon-222, the second retentate stream 315 will have a radon-222 concentration of 3.78 pCi/L, which is below the target value of 4 pCi/L. Accordingly, a natural gas with 6.5 pCi/L can be successfully treated with this approach and shipped to an end user.

TABLE 7

Simulated radon removal system with very low radon, high pressure permeate

| Stream Name | | FEED 303 | SECOND RETENTATE STREAM 315 | FIRST PERMEATE STREAM 307 |
|---|---|---|---|---|
| Phase | | Vapor | Vapor | Vapor |
| Pressure (PSIA) | | 800 | 795 | 150 |
| Flowrate (kg · mol/h) | | 100 | 83.948 | 16.052 |
| Composition | Concentration | | | |
| Methane | Mole fraction | 0.9539 | 0.958466 | 0.929997 |
| Ethane | Mole fraction | 0.005 | 0.004132 | 0.009544 |
| Propane | Mole fraction | 0.001 | 0.000752 | 0.002298 |
| $N_2$ | Mole fraction | 0.02 | 0.022012 | 0.009477 |
| $CO_2$ | Mole fraction | 0.02 | 0.014587 | 0.048329 |
| $H_2O$ | Mole fraction | 0.0001 | 0.0000514 | 0.000354 |
| Radon-222 | pCi/L | 6.5 | 3.78 | 20.71 |

As shown in Table 7, it is possible to reduce the radon-222 concentration from 6.5 pCi/L to below 4 pCi/L. Therefore, the treated gas can be shipped to nearby end users, regardless of transit time or pipeline length. Since the initial amount of radon-222 in Table 7 is lower, the membrane can work at a higher pressure for the permeate, resulting in less power required to meet the 4 pCi/L radon-222 concentration requirement. Additionally, the membrane process is optimized to work with minimal pressure reduction for the permeate, which will be recompressed either and sent to the reservoir or to storage.

Example 5: Simulation of a Radon Removal System with Intermediate Radon, Low Pressure Permeate A simulation of a system 301 was used to calculate the parameters of the second retentate stream 315 and the first permeate stream 307, given a feed stream 303 with the parameters shown in Table 8. The surface areas of the membranes (304, 308) are given in arbitrary units.

Given a natural gas stream 303 with a vapor at a pressure of 800 PSIA and an initial concentration of 129 pCi/L, the second retentate stream 315 will have a radon-222 concentration of 4.00 pCi/L.

TABLE 8

Simulation of a radon removal system with intermediate radon, low pressure permeate

| Stream Name | | FEED 303 | SECOND RETENTATE STREAM 315 | FIRST PERMEATE STREAM 307 |
|---|---|---|---|---|
| Phase | | Vapor | Vapor | Vapor |
| Pressure (PSIA) | | 800 | 795 | 22 |
| Flowrate (kg · mol/h) | | 100 | 795 | 19.808 |
| Composition | Concentration | | | |
| Methane | Mole fraction | 0.9539 | 0.968193 | 0.89615 |
| Ethane | Mole fraction | 0.005 | 0.002794 | 0.013914 |
| Propane | Mole fraction | 0.001 | 0.000336 | 0.003685 |
| $N_2$ | Mole fraction | 0.02 | 0.023198 | 0.007052 |
| $CO_2$ | Mole fraction | 0.02 | 0.005478 | 0.078695 |
| $H_2O$ | Mole fraction | 0.0001 | 0.000001 | 0.000503 |
| Radon-222 | pCi/L | 129 | 4.0 | 635 |

Accordingly, a natural gas with 129 pCi/L can be successfully treated with this approach and shipped to an end user with a second retentate stream that includes only 4.0 pCi/L of Radon-222. However, this process requires that the second permeate stream 317 is compressed with a compressor and recycled into the feed stream 303 at a high pressure to enable higher radon-222 recovery.

Example 6: Simulation of a Radon Removal System with High Radon, Low Pressure Permeate Stream A simulation of a system 301 was used to calculate the parameters of the second retentate stream 315 and the first permeate stream 307, given a feed stream 303 with the parameters shown in Table 9. The surface areas of the membranes (304, 308) are given in arbitrary units.

Given a natural gas stream 303 with an initial flow rate of 100 kg·mol/hr and initial pressure of 800 PSIA, a natural gas with 270 pCi/L of radon-222 can result in a second retentate stream 315 stream with 8.38 pCi/L.

TABLE 9

Simulation of a radon removal system with high radon, low pressure permeate stream

| Stream Name | | FEED 303 | SECOND RETENTATE STREAM 315 | FIRST PERMEATE STREAM 307 |
|---|---|---|---|---|
| Phase | | Vapor | Vapor | Vapor |
| Pressure (PSIA) | | 800 | 795 | 22 |
| Flowrate (kg · mol/h) | | 100 | 80.192 | 19.808 |
| Composition | Concentration | | | |
| Methane | Mole fraction | 0.9539 | 0.968193 | 0.89615 |
| Ethane | Mole fraction | 0.005 | 0.002794 | 0.013914 |
| Propane | Mole fraction | 0.001 | 0.000336 | 0.003685 |
| $N_2$ | Mole fraction | 0.02 | 0.023198 | 0.007052 |
| $CO_2$ | Mole fraction | 0.02 | 0.005478 | 0.078695 |
| $H_2O$ | Mole fraction | 0.0001 | 0.000001 | 0.000503 |
| Radon-222 | pCi/L | 270 | 8.38 | 1329 |

As shown in Table 9, it is possible to reduce the radon-222 concentration from 270 pCi/L to below 8.5 pCi/L. While the treated gas is above the target of 4 pCi/L, a transit time of at least 100 hours will result in a gas stream that is lower than 4 pCi/L for the end user, due to the radioactive decay that occurs during transit.

Example 7: Simulation of a Radon Removal System with Very High Radon, Low Pressure Permeate Stream A simulation of a system 301 was used to calculate the parameters of the second retentate stream 315 and the second permeate stream 317, given a feed stream 303 with the parameters shown in Table 10. The surface areas of the membranes (304, 308) are given in arbitrary units.

Table 10 shows an example 2-step membrane process to treat a natural gas 303 that includes 370 pCi/L of radon-222. With an initial flow rate of 100 kg·mol/hr and an initial pressure of 800 PSIA, a natural gas with 370 pCi/L can result in a second permeate stream 317 with a concentration of 11.49 pCi/L.

TABLE 10

Simulation of a radon removal system with very high radon, low pressure permeate stream

| Stream Name | | FEED 303 | SECOND PERMEATE STREAM 317 | FIRST PERMEATE STREAM 307 |
|---|---|---|---|---|
| Phase | | Vapor | Vapor | Vapor |
| Pressure (PSIA) | | 800 | 795 | 22 |
| Flowrate (kg · mol/h) | | 100 | 80.192 | 19.808 |
| Composition | Concentration | | | |
| Methane | Mole fraction | 0.9539 | 0.968193 | 0.89615 |
| Ethane | Mole fraction | 0.005 | 0.002794 | 0.013914 |
| Propane | Mole fraction | 0.001 | 0.000336 | 0.003685 |
| $N_2$ | Mole fraction | 0.02 | 0.023198 | 0.007052 |
| $CO_2$ | Mole fraction | 0.02 | 0.005478 | 0.078695 |
| $H_2O$ | Mole fraction | 0.0001 | 0.000001 | 0.000503 |
| Radon-222 | pCi/L | 370 | 11.49 | 1821 |

As shown in Table 10, it is possible to reduce the radon concentration from 370 pCi/L to below 11.5 pCi/L. This treated gas is above the target of 4 pCi/L, however, a transit time of at least 144 hours will result in a gas stream that is lower than 4 pCi/L for the end user, due to the radioactive decay that occurs during transit.

Embodiments

Certain embodiments of the present disclosure are provided as follows.

Embodiment 1. A system for removing radon from a natural gas stream, the system comprising:
a first radon permeable membrane configured to receive a natural gas stream from a natural gas source, wherein the first radon permeable membrane is configured to separate the natural gas stream into a radon rich permeate stream with a higher concentration of radon than the natural gas stream and a radon reduced retentate stream with a lower concentration of radon than the natural gas stream.

Embodiment 2. The system of embodiment 1, wherein the first radon permeable membrane comprises a polysiloxane-type membrane.

Embodiment 3. The system of embodiment 2, wherein the polysiloxane-type membrane comprises poly di-R,R'-siloxane, wherein R and R' are selected from the group consisting of methyl, ethyl, propyl, butyl, pentyl, hexyl, heptyl, octyl, nonyl, decyl, undecyl, dodecyl, phenyl, and naphthyl functional groups.

Embodiment 4. The system of embodiment 3, wherein the polysiloxane-type membrane comprises polydimethylsiloxane.

Embodiment 5. The system of any one of embodiments 1-4, wherein the system is further configured to reinject the radon rich permeate stream from the first radon permeable membrane into the natural gas source.

Embodiment 6. The system of any one of embodiments 1-5, wherein the system further comprises a storage unit, wherein the storage unit is configured and coupled to receive the radon rich permeate stream from the first radon permeable membrane and to store the radon rich permeate stream for a period of time to yield a decayed permeate stream.

Embodiment 7. The system of embodiment 7, wherein the system is configured and coupled to combine the decayed permeate stream from the storage unit with the radon reduced retentate stream to form a sales gas stream.

Embodiment 8. The system of any one of embodiments 1-7, wherein the system further comprises a second radon permeable membrane, wherein the second radon permeable membrane is configured and coupled to receive the radon reduced retentate stream from the first radon permeable membrane and to separate the radon reduced retentate stream into a second permeate stream and a second retentate stream.

Embodiment 9. The system of embodiment 8, wherein the second radon permeable membrane comprises a polysiloxane-type membrane.

Embodiment 10. The system of any embodiment 9, wherein the polysiloxane-type membrane comprises poly di-R,R'-siloxane, wherein R and R' are selected from the group consisting of methyl, ethyl, propyl, butyl, pentyl, hexyl, heptyl, octyl, nonyl, decyl, undecyl, dodecyl, phenyl, and naphthyl functional groups.

Embodiment 11. The system of embodiment 9 or 10, wherein the polysiloxane-type membrane comprises polydimethylsiloxane.

Embodiment 12. The system of any one of embodiments 8-11, wherein the system is configured and coupled to combine the second permeate stream from the second radon permeable membrane with the natural gas stream upstream of the first radon permeable membrane.

Embodiment 13. The system of any one of embodiments 8-12, wherein the system further comprises a storage unit, wherein the storage unit is configured and coupled to receive the radon rich permeate stream from the first radon permeable membrane and to store the radon rich permeate stream for a period of time to yield a decayed permeate stream.

Embodiment 14. The system of embodiment 13, wherein the system is further configured and coupled to combine the decayed permeate stream from the storage unit with the second retentate stream to form a sales gas.

Embodiment 15. A method for removing radon from a natural gas stream, the method comprising:
providing a natural gas stream from a natural gas source; and
passing the natural gas stream through a first radon permeable membrane to yield a retentate stream reduced in radon compared to the natural gas stream and a permeate stream enriched in radon compared to the natural gas stream.

Embodiment 16. The method of embodiment 15, wherein the first radon permeable membrane comprises a polysiloxane-type membrane.

Embodiment 17. The method of embodiment 16, wherein the polysiloxane-type membrane comprises poly di-R,R'-siloxane, wherein R and R' are selected from the group consisting of methyl, ethyl, propyl, butyl, pentyl, hexyl, heptyl, octyl, nonyl, decyl, undecyl, dodecyl, phenyl, and naphthyl functional groups.

Embodiment 18. The method of embodiment 17, wherein the polysiloxane-type membrane comprises polydimethylsiloxane.

Embodiment 19. The method of any one of embodiments 15-18, further comprising reinjecting the radon rich permeate stream into the natural gas source.

Embodiment 20. The method of any one of embodiments 15-19, further comprising storing the radon rich permeate stream in a storage unit for a period of time to yield a decayed permeate stream.

Embodiment 21. The method of embodiment 20, further comprising combining the decayed permeate stream and the radon reduced retentate stream to form a sales gas stream.

Embodiment 22. The method of any one of embodiments 15-21, further comprising passing the radon reduced retentate stream through a second radon permeable membrane to yield a second permeate stream and a second retentate stream.

Embodiment 23. The method of embodiment 22, wherein the second radon permeable membrane comprises a polysiloxane-type membrane.

Embodiment 24. The method of embodiment 23, wherein the polysiloxane-type membrane comprises poly di-R,R'-siloxane, wherein R and R' are selected from the group consisting of methyl, ethyl, propyl, butyl, pentyl, hexyl, heptyl, octyl, nonyl, decyl, undecyl, dodecyl, phenyl, and naphthyl functional groups.

Embodiment 25. The method of embodiment 23 or 24, wherein the polysiloxane-type membrane comprises polydimethylsiloxane.

Embodiment 26. The method of any one of embodiments 22-25, further comprising combining the second permeate stream with the natural gas stream upstream of the first radon permeable membrane.

Embodiment 27. The method of any one of embodiments 22-26, further comprising determining the concentration of radon-222 in the radon rich permeate stream; and storing the radon rich permeate stream in a storage unit for a period of time to yield a decayed permeate stream, wherein the period of time is based on the concentration of radon-222 in the radon rich permeate stream, a transit time to an end user, or both the concentration of radon-222 in the radon rich permeate stream and a transit time to an end user.

Embodiment 28. The method of embodiment 27, further comprising combining the decayed permeate stream with the second retentate stream to form a sales gas.

A number of implementations of the disclosure have been described. Nevertheless, it will be understood that various modifications may be made without departing from the spirit and scope of the disclosure.

What is claimed is:

1. A method for removing radon from a natural gas stream, the method comprising:
providing a natural gas stream from a natural gas source; and
passing the natural gas stream through a first radon permeable membrane to yield a retentate stream reduced in radon compared to the natural gas stream and a permeate stream enriched in radon compared to the natural gas stream.

2. The method of claim 1, wherein the first radon permeable membrane comprises a polysiloxane-type membrane.

3. The method of claim 2, where in the polysiloxane-type membrane comprises poly di-R,R'-siloxane, wherein R and R' are selected from the group consisting of methyl, ethyl, propyl, butyl, pentyl, hexyl, heptyl, octyl, nonyl, decyl, undecyl, dodecyl, phenyl, and naphthyl functional groups.

4. The method of claim 3, wherein the polysiloxane-type membrane comprises polydimethylsiloxane.

5. The method of claim 1, further comprising reinjecting the radon rich permeate stream into the natural gas source.

6. The method of claim 1, further comprising storing the radon rich permeate stream in a storage unit for a period of time to yield a decayed permeate stream.

7. The method of claim 6, further comprising combining the decayed permeate stream and the radon reduced retentate stream to form a sales gas stream.

8. The method of claim 1, further comprising:
passing the radon reduced retentate stream through a second radon permeable membrane to yield a second permeate stream and a second retentate stream.

9. The method of claim 8, wherein the second radon permeable membrane comprises a polysiloxane-type membrane.

10. The method of claim 9, wherein the polysiloxane-type membrane comprises poly di-R,R'-siloxane, wherein R and R' are selected from the group consisting of methyl, ethyl, propyl, butyl, pentyl, hexyl, heptyl, octyl, nonyl, decyl, undecyl, dodecyl, phenyl, and naphthyl functional groups.

11. The method of claim 10, wherein the polysiloxane-type membrane comprises polydimethylsiloxane.

12. The method of claim 8, further comprising combining the second permeate stream with the natural gas stream upstream of the first radon permeable membrane.

13. The method of claim 8, further comprising:
determining the concentration of radon-222 in the radon rich permeate stream; and
storing the radon rich permeate stream in a storage unit for a period of time to yield a decayed permeate stream, wherein the period of time is based on
the concentration of radon-222 in the radon rich permeate stream,
a transit time to an end user, or
both the concentration of radon-222 in the radon rich permeate stream and a transit time to an end user.

14. The method of claim 13, further comprising combining the decayed permeate stream with the second retentate stream to form a sales gas.

* * * * *